3,485,832
12-ALKYLQUINOXALOPHENOXAZINE COMPOUNDS AND CATIONS
Raymond C. Harris and James M. Straley, Kingsport, Tenn., assignors to Eastman Kodak Company, Rochester, N.Y., a corporation of New Jersey
No Drawing. Filed Mar. 29, 1967, Ser. No. 626,689
Int. Cl. C07d 99/00; C09b 19/00; D06p
U.S. Cl. 260—244                                    7 Claims

ABSTRACT OF THE DISCLOSURE

Novel 12-alkylquinoxalophenoxazine compounds and cations prepared by reacting an N-alkyl-3-hydroxy-2-phenazinone with an o-aminophenol are useful as dyes for acrylic, modacrylic, and acid-modified polyester textile materials.

---

This invention relates to novel chemical compounds and cations and to the use of such compounds and cations as dyes for acrylic, modacrylic and acid-modified polyester textile fibers, yarns and fabrics.

The compounds and cations of the invention have the general formula

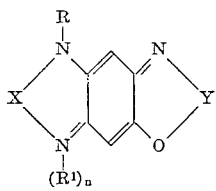

wherein R represents an alkyl group, $R^1$ represents lower alkyl or benzyl, $n$ represents 0 or 1, and X and Y each represent an o-phenylene or an o-naphthylene group.

The compounds and cations of the invention give blue to violet dyeings, which exhibit excellent fastness properties, on acrylic, modacrylic, and acid-modified textile materials when applied thereto according to conventional dyeing procedures.

The alkyl group represented by R can contain up to about 12 carbon atoms which can be branch or straight chain, substituted or unsubstituted alkyl. Typical unsubstituted alkyl groups include, for example, methyl, ethyl, propyl, isopropyl, butyl, sec-butyl, 2-ethyl hexyl, octyl, etc. Illustrative of the substituents that can be present on the alkyl group represented by R are hydroxy, alkoxy, nitro, cyano, lower alkanoyloxy, lower alkoxycarbonyl, halo, e.g. chloro, bromo, fluoro, lower alkanoylamido, carbamoyl, lower alkyl substituted carbamoyl, lower alkyl substituted carbamoyloxy, phenyl substituted carbamoyloxy, lower alkylsulfonyl, lower alkoxycarbonyloxy, lower dicarboxylic acid imido, phenyl phenoxy, lower alkylsulfonamido, etc.

Preferably, the alkyl groups represented by R are those which contain up to about four carbon atoms. Examples of the preferred alkyl groups include methyl, ethyl, propyl, isopropyl, and butyl. Examples of preferred substituted alkyl groups represented by R are 2-hydroxyethyl, 2,3-dihydroxypropyl, 2-methoxyethyl, 2-ethoxyethyl, 2-nitroethyl, 2-cyanoethyl, 2-ethoxyethyl, 2-acetoxyethyl, 3-ethoxycarbonylpropyl, 2-chloroethyl, 3-chloropropyl, 2-bromoethyl, trifluoromethyl, 3-chloro-2-hydroxypropyl, 2-acetamidoethyl, 2-carbamoylethyl, 2-N-propylcarbamoylethyl, 2-N,N-dimethylcarbamoylethyl, 2-N-ethylcarbamoyloxyethyl, 3-N-phenylcarbamoyloxyethyl, 2-methylsulfonylethyl, 2-ethylcarbonyldioxyethyl, 2-succinimidoethyl, benzyl, phenoxymethyl, 2-methylsulfonamidoethyl, sulfamoyl, etc.

Methyl, ethyl, propyl, isopropyl, butyl, etc. are typical of the lower alkyl groups represented by $R^1$.

The o-phenylene groups which each of X and Y can represent can be unsubstituted or substituted, for example, with lower alkyl groups, lower alkoxy groups, halogen, lower alkanoylamino, nitro, cyano, lower alkylsulfonyl, carbamoyl, lower alkyl substituted carbamoyl, hydroxyl, aryl, alkanoyl, benzamido, amino, lower alkyl substituted amino, arylamino, lower alkoxycarbonyl, sulfamoyl, lower alkyl substituted sulfamoyl, lower alkylsulfonamide, dicarboxylic acid imido, thiocyanato, lower alkylthio, etc. Illustrative of the groups represented by X and Y are o-phenylene, 1,2-naphthylene, 2,3-naphthylene, 3,4-naphthylene, 4-trifluoromethyl-2-phenylene, 4-chloro-5-methyl-2-phenylene, 4-sulfamoyl-2-phenylene, 4-nitro-2-phenylene, 4-methylsulfonyl-5-methyl-2-phenylene, 4-methoxy-2-phenylene, 3-acetyl-2-phenylene, etc.

Examples of the lower alkyl groups that can be present on the o-phenylene groups represented by X and Y are those described above in the definition of R. Examples of the alkoxy groups are methoxy, ethoxy, propoxy, butoxy, etc. Chlorine and bromine are illustrative of the halogen atoms that can be present on the groups represented by X and Y. Typical lower alkanoyl and alkanoylamino groups include acetyl, propionyl, butyryl, acetamido, propionamido, butyramido, etc. Examples of the lower alkylsulfonyl and lower alkylsulfonamido, groups which can be present on the o-phenylene groups X and Y include methylsulfonyl, ethylsulfonyl, butylsulfonyl, methylsulfonamido, ethylsulfonamido, propylsulfonamido, butylsulfonamido, etc.

N-methylsulfamoyl, N-propylsulfamoyl, N,N-diethylsulfamoyl, N-ethylcarbamoyl, N,N-dibutylcarbamoyl, and, N,N-dimethylcarbamoyl are typical substituted sulfamoyl and carbamoyl groups that can be present on the o-phenylene groups represented by X and Y. Illustrative of the alkoxycarbonyl groups are methoxycarbonyl, ethoxycarbonyl, butoxycarbonyl, etc. Dimethylamino, diethylamino, and dibutylamino are examples of the substituted amino groups. Anilino is typical of the arylamino groups. Succinimido, glutarimido, phthalimido, and maleimido are typical dicarboxylic acid imido groups. Methylthio, ethylthio, propylthio, isopropylthio, and butylthio are illustrative of the alkylthio groups that can be present on the o-phenylene group X and Y. Phenyl and phenyl substituted with lower alkyl, e.g. p-tolyl, lower alkoxy, e.g., p-anisyl, and halogen, e.g. p-chlorophenyl, are examples of the aryl groups.

Preferably, Y represents o-naphthylene or an o-phenylene group having the formula

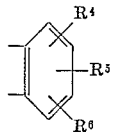

wherein $R^4$, $R^5$, $R^6$ are the same or different and each represents hydrogen, lower alkyl, trifluoromethyl, lower alkoxy, sulfamoyl, lower alkylsulfonyl, halogen, or nitro.

The groups represented by X are preferably a o-naphthylene or an o-phenylene group having the formula

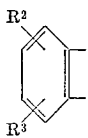

wherein $R^2$ and $R^3$ are the same or different and each represents hydrogen or a substituent described in the preceding definition of $R^4$, $R^5$, and $R^6$.

The novel compounds of the invention are prepared by reacting an N-alkyl-3-hydroxy-2-phenazinone with an o-aminophenol or an o-aminonaphthol according to the following reaction:

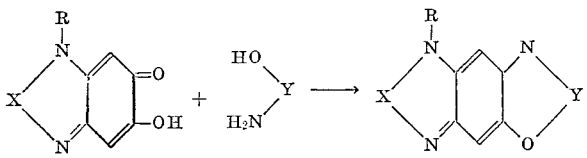

wherein R, X, and Y are defined above. The phenazinones used to prepare the novel compounds of the invention are prepared by reacting equimolar amounts of an N-alkyl-o-phenylenediamine with 2,5-dihydroxybenzoquinone as shown below:

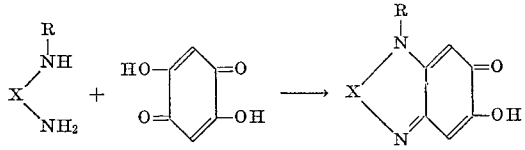

The novel cations of the invention are prepared by treating the unquaternized compounds described above with an alkylating agent at elevated temperatures to obtain cations having the formula

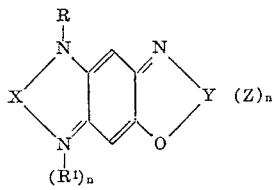

wherein R and $R^1$ are defined above, $n$ is 1, and Z represents a monovalent acid anion derived from the alkylating agent. Suitable alkylating agents that can be used in preparing the novel cations of the invention are the dialkyl sulfates, the alkyl halides, the aralkyl halides, the alkyl esters of aryl sulfonic acids, etc. Specific alkyating agents include, for example, dimethyl sulfate, diethyl sulfate, dipropyl sulfate, ethyl bromide, ethyl chloride, methyl iodide, benzyl chloride, benzyl bromide, methyl-p-toluenesulfonate, ethyl-p-toluenesulfonate, and ethyl benzenesulfonate.

The primary color of the novel compounds and cations of the invention is attributable to the conjugation of the molecule

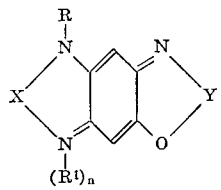

wherein R, $R^1$, $n$, X, and Y are defined above. Thus, the substituents present on the groups represented by R, X, and Y do not materially affect the primary usefulness of the novel compounds and cations as dyes for the above-mentioned textile materials. These substituents function primarily as auxochrome groups to control the shade of the novel compounds and cations.

Although the novel cations of the invention exist in combination with an anion, the cations are described herein and in the appended claims as not being associated with any anion. The anion does not effect the usefulness of the cations as dyes nor does it affect the dye affinity of the cations for the described textile materials. When the compounds are used to dye polyacrylonitrile textile, the anion becomes associated with a positively charged ion derived from the polyacrylonitrile and is removed from the dye cation and polyacrylonitrile textile material, either in the dyebath or in a subsequent washing of the dyed polyacrylonitrile textile material. Since the cation of a cationic dye is responsible for the color of the cationic dye, the particular anion associated with the cation is not important.

The preparation of the novel compounds and cations of the invention are further described and illustrated in the following examples.

PREPARATION OF THE PHENAZINONES

Example A

The phenazinones intermediates used in the preparation of the novel compounds of the invention are prepared according to the procedure described in the following reaction.

68 g. (0.5 mole) of n-ethyl-o-phenylenediamine and 70 g. (0.5 mole) of 2,5-dihydroxybenzoquinone are mixed in 1300 ml. of water and 100 ml. of concentrated hydrochloric acid. The mixture is heated to boiling and stirred at reflux temperature for one hour. The reaction mixture is then cooled to room temperature, made basic with 50% sodium hydroxide solution and filtered through a sintered glass funnel. The filtrate is neutralized with acetic acid and filtered. The filter cake is thoroughly washed with water and dried to give a quantitative yield of 10-ethyl-3-hydroxy-2-phenazinone.

Example B

The 10-methyl-3-hydroxy-2-phenazinone is prepared as follows: 61 g. (0.5 m.) of N-methyl-o-phenylenediamine and 70 grams (0.5 m.) of 2,5-dihydroxybenzoquinone are mixed in 1300 cc. of water containing 100 cc. of concentrated hydrochloric acid. The slurry is heated to boiling and stirred under reflux for one hour. The reaction mixture is then cooled to room temperature, made basic with 50% sodium hydroxide solution, and filtered through a sintered glass funnel. The filtrate is neutralized with acetic acid and filtered. The filter cake is thoroughly washed with water and dried. Yield=98% of product which is pure enough for use without further treatment.

By replacing the phenylenediamine reactant employed in the above examples with various substituted derivatives of both phenylenediamine and naphthylenediamine, the phenazinones useful in preparing the compounds of the invention can be obtained.

PREPARATION OF THE DYES

Example 1

(A) A mixture of 4.8 g. (.02 m.) of 10-ethyl-3-hydroxy-2-phenazinone, and 2.92 g. (.02 m.) of o-aminophenol hydrochloride is slurried in 25 ml. of 3-picoline and heated slowly to reflux temperature. The solution is stirred at 143° C. for 3½ hours, removing any water as formed. The reaction mixture is then chilled and filtered, and the precipitate washed with water. The filter cake is then slurried in dilute caustic soda solution and filtered. The precipitate is thoroughly washed with water and dried at 60° C. The product dyes acrylic fibers dark blue violet shades with excellent fastness to light, washing and alkaline perspiration tests. It has the formula:

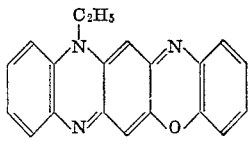

The compound obtained according to the procedure described in Example 1 can alternatively be prepared according to the following methods.

(B) A slurry of 4.8 g. of 10-ethyl-3-hydroxy-2-phenazinone, 3 g. of o-aminophenol hydrochloride and 25 ml. of ethylene glycol is slowly heated to 175° C. and stirred for 1¼ hours at 175–185° C. The reaction mixture is then drowned in 600 ml. of water, made basic with dilute aqueous ammonia and filtered. The product is slurried in dilute caustic solution, filtered and washed with water. The product is identical to that of Example 1.

(C) A slurry of 4.8 g. of 10-ethyl-3-hydroxy-2-phenazinone and 3 g. of o-aminophenol hydrochloride in 100 ml. of water is heated at 175° C. in a stainless steel rocking autoclave for 6 hours. The contents of the autoclave are then made basic with dilute aqueous ammonia and filtered. The filter cake is washed with water, slurried in dilute caustic soda solution and refiltered. This filter cake is thoroughly washed with water and dried at 60° C. The product is identical to that of Example 1.

Example 2

3.13 g. (.01 mole) of 12-ethyl-12H-quinoxalino[2-3b]-phenoxazine, prepared as in Examiple 1 in 25 ml. of dimethyl sulfate is heated on a steam bath for 1.5 hours. The reaction mixture is drowned in ether and filtered. The precipitate is thoroughly washed with ether and vacuum dried. Yield=4.3 g.

The methosulfate quaternary salt thus formed dyes acrylic fibers such as "Acrilan" and "Orlon" bright blue violet shades with excellent light and wash fastness properties.

One gram of the above methosulfate quaternary salt is dissolved in warm water and 3 g. of potassium iodide is added. After cooling to room temperature, the precipitated iodide quaternary is filtered off, washed with water and dried. Dyeings on "Orlon" are the same shades and have the same fastness properties as the methosulfate quaternary.

Example 3

4.8 g. of 10-ethyl-3-hydroxy-2-phenazinone and 3.91 g. of 1-amino-2-naphthol hydrochloride are slurried in 25 ml. of 3-picoline. The reaction mixture is heated to 143° C. and stirred at gentle reflux for 4 hours removing water as formed. The reaction mixture is then cooled to room temperature and filtered. The filter cake is washed with water, then with a weak aqueous ammonia solution, then thoroughly with water. The product, 14-ethyl-14H-benzo-[j]quinoxaline-[2,3-b]phenoxazine, is a dark powder which dyed acrylic fibers blue. It has the structure:

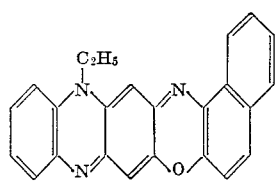

Example 4

A slurry of 2 g. of 14-ethyl-14H-benzo[j]quinoxalino-[2,3-b]phenoxazine, prepared as described in Example 3 in 25 ml. of dimethyl sulfate is stirred 2 hours at 95° C. The reaction mixture is drowned in diethyl ether. The precipitate is filtered off and thoroughly washed with ether. The quaternary methosulfate dyes acrylic fibers blue shades with excellent fastness properties.

Example 5

2.68 g. of 10-butyl-3-hydroxy-2-phenazinone and 1.77 g. of 2-amino-4-trifluoromethyl phenol are slurried in 12.5 ml. of 3-picoline. One ml. of concentrated hydrochloric acid is added. The reaction mixture is heated at reflux for 4 hours. It is then cooled and filtered. The filter cake is washed with water and then slurried in 1% sodium hydroxide solution. This slurry is then filtered and washed alkali-free with warm water. The 12-butyl-2-trifluoromethyl-12H-quinoxaline-[2,3-b]phenoxazine thus formed dyes acrylic fibers bright reddish-violet shades and has the structure:

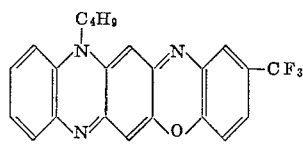

Example 6

A mixture of 4.8 g. of 10-ethyl-3-hydroxy-2-phenazinone, 3.5 g. of 2-amino-4-chloro-5-methylphenol, 2.5 ml. of concentrated hydrochloric acid and 25 ml. of ethylene glycol is heated slowly to 175° C. and stirred at 175° C. to 185° C. for 2½ hours. The solution is then allowed to cool to approximately 100° C. and drowned in 600 ml. of water. The aqueous slurry is made basic with ammonia, filtered, and the filter cake thoroughly washed with water. The moist cake is then slurried in a 3% sodium hydroxide solution, filtered and washed with hot water until a colorless filtrate was obtained. The product is recrystallized from a 1,4-dioxane-water mixture. Acrylic fibers are dyed in blue-violet shades with the product 2-chloro-12-ethyl - 3 - methyl - 12H - quinoxalino[2,3-b]phenoxazine, which has the structure:

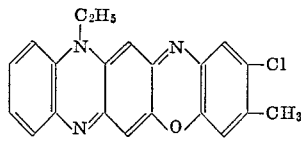

Example 7

3.64 g. of 2-chloro-12-ethyl-3-methyl-12H-quinoxalino-[2,3-b]phenoxazine from Example 6 in 90 ml. of dry toluene is heated to 90° C. 5 g. of dimethyl sulfate is added over a period of 15 minutes. The reaction mixture is stirred at 90° C. for 45 minutes, then cooled to 25° C. and filtered. The precipitate is washed with cold toluene, then with diethyl ether and vacuum dried. The methosulfate quaternary thus formed dyes acrylic fibers blue-violet shades with excellent properties.

Example 8

A mixture of 4.52 g. of 10-methyl-3-hydroxy-2-phenazinone, 2.91 g. of o-aminophenol and 25 ml. of 3-picoline is heated to gentle reflux and stirred at the boil for 3 hours. The reaction mixture is then cooled and filtered, and the precipitate washed with water. The precipitate is then slurried in warm 1% sodium hydroxide solution, filtered at 60° C., washed with water until alkali free and dried at 60° C. The product, 12-methyl-12H-quinoxalino-[2,3-b]phenoxazine, dyes acrylic fibers blue-violet shades with excellent fastness properties and has the formula:

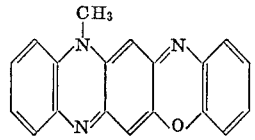

Example 9

3.05 g. of 3-hydroxy-10-methyl-7-sulfamoyl-2-phenazinone and 2 g. of 2-amino-4-chloro-5-methylphenol are reacted according to the procedure described in Example 4 except that stirring at 175° C. to 185° C. is continued for 4 hours. The product, 2-chloro-3,12-dimethyl-9-sulfamoyl-12H-quinoxaline-[2,3-b]phenoxazine, dyes acrylic fibers blue-violet shades and has the structure:

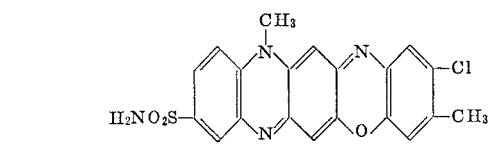

Example 10

The reaction is carried out exactly as Example 5 except using 2.54 grams of 10-ethyl-3-hydroxy-7-methyl-2-phenazinone instead of 2.64 grams of 10-butyl-3-hydroxy-2-phenazinone. The product obtained dyes acrylic fibers in fast blue shades. The color is a more greenish-blue than the dye of Example 5. It has the structure:

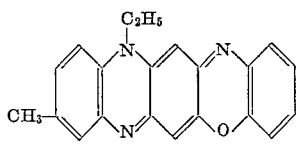

Example 11

4.8 g. of 9,12-dimethyl-12H-quinoxalino[2,3-b]phenoxazine, prepared according to the procedures described above, in 25 ml. of diethyl sulfate is stirred at 90° C. for 2 hours. The reaction mixture is drowned in a large excess of diethyl ether, filtered, and the filter cake thoroughly washed with ether. The product is dried at 60° C. The quaternary ethosulfate dyes acrylic fibers violet shades with good fastness properties.

The compounds and cations described in the examples of the following table are prepared according to the procedure employed in the preceding examples. The appropriate phenazinone and the appropriate o-aminophenol or o-aminonaphthol are reacted to yield the novel compounds of the invention which, when treated with an alkylating agent, yield the novel cations of the invention. The compositions of the table correspond to the general formula

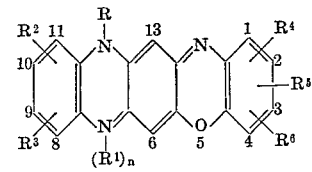

The color given in each of the examples below refers to the color of the dyes on acrylic textile materials.

| Example | R | $(R^1)_n$ | $R^2$ | $R^3$ | $R^4$ | $R^5$ | $R^6$ | Color |
|---|---|---|---|---|---|---|---|---|
| 12 | —$CH_3$ | None | H | 9-$CH_3$ | H | H | H | Blue-Violet. |
| 13 | —$C_2H_5$ | None | | 9-$CH_3$ | 2-Cl | | | Do. |
| 14 | —$C_2H_5$ | —$CH_3$ | H | 9-$CH_3$ | 2-Cl | H | H | Do. |
| 15 | —$C_2H_5$ | None | H | 9-$CH_3$ | 2-$NO_2$ | H | H | Violet. |
| 16 | —$CH_3$ | —$CH_3$ | H | 9-$CH_3$ | 2-$NO_2$ | H | H | Do. |
| 17 | —$C_2H_5$ | None | H | 9-$CH_3$ | H | 3-$NO_2$ | H | Red-Violet. |
| 18 | —$C_2H_5$ | —$CH_3$ | H | 9-$CH_3$ | H | 3-$NO_2$ | H | Do. |
| 19 | —$C_2H_5$ | None | H | 9-$CH_3$ | H | 3-$CF_3$ | H | Do. |
| 20 | —$C_2H_5$ | —$C_2H_5$ | H | 9-$CH_3$ | H | 3-$CF_3$ | H | Do. |
| 21 | —$C_2H_5$ | None | H | 9-$CH_3$ | 2-Cl | 3-Cl | 4-Cl | Violet. |
| 22 | —$C_2H_5$ | —$C_2H_5$ | H | 9-$CH_3$ | 2-Cl | 3-Cl | 4-Cl | Do. |
| 23 | —$C_2H_5$ | None | H | 9-$CH_3$ | H | $R_5$ and $R_6$ combined at 3 and 4 pos. represent —CH=CH—CH=CH— | | Blue. |
| 24 | —$C_2H_5$ | —$C_2H_5$ | H | 9-$CH_3$ | H | $R_5$ and $R_6$ combined at 3 and 4 pos. represent —CH=CH—CH=CH— | | Do. |
| 25 | —$C_2H_5$ | None | H | 9-$CH_3$ | H | $R_5$ and $R_6$ combined at 2 and 3 pos. represent —CH=CH—CH=CH— | | Do. |
| 26 | —$C_2H_5$ | —$C_2H_5$ | H | 9-$CH_3$ | H | $R_5$ and $R_6$ combined at 2 and 3 pos. represent —CH=CH—CH=CH— | | Do. |
| 27 | —$CH_3$ | —$C_2H_5$ | H | 9-$CH_3$ | $R_4$ and $R_5$ combined at 1 and 2 pos. represent —CH=CH—CH=CH— | | H | Do. |
| 28 | —$CH_3$ | -benzyl | H | H | 2-$NO_2$ | H | H | Red-Violet. |
| 29 | —$C_2H_5$ | None | H | 9-$CH_3$ | 2-Cl | 3-$CH_3$ | H | Blue-Violet. |
| 30 | —$CH_3$ | None | H | H | 2-$NO_2$ | H | H | Red-Violet. |
| 31 | —$CH_3$ | —$CH_3$ | H | H | H | 3-$NO_2$ | H | Do. |
| 32 | —$C_2H_5$ | None | H | H | 2-$NH_2$ | H | H | Blue-Violet. |
| 33 | —$C_2H_5$ | —$CH_3$ | H | H | 2-$NH_2$ | H | H | Do. |
| 34 | —$C_2H_5$ | None | H | H | 2-$CF_3$ | H | H | Red-Violet. |
| 35 | —$C_2H_5$ | —$C_2H_5$ | H | H | H | 3-$CF_3$ | H | Do. |
| 36 | —(iso)$C_3H_7$ | None | H | H | 2-Cl | 3-Cl | 4-Cl | Violet. |
| 37 | —$C_4H_9$(n) | None | H | H | H | $R_5$ and $R_6$ combined at 3 and 4 pos. represent —CH=CH—CH=CH— | | Blue. |
| 38 | —$C_4H_9$(n) | None | H | H | H | $R_5$ and $R_6$ combined at 2 and 3 pos. represent —CH=CH—CH=CH— | | Do. |
| 39 | —$C_4H_9$(n) | None | H | H | $R_4$ and $R_5$ combined at 1 and 2 pos. represent —CH=CH—CH=CH— | | H | Do. |
| 40 | —$C_2H_5$ | None | H | H | 2-$C_6H_5$ | H | H | Blue-Violet. |
| 41 | —$C_2H_5$ | Benzyl | H | H | 2-$C_6H_5$ | H | H | Do. |
| 42 | —$C_2H_5$ | None | H | H | H | 3-$SO_2CH_3$ | H | Violet. |
| 43 | —$C_2H_5$ | —$CH_3$ | H | H | H | 3-$SO_2CH_3$ | H | Do. |
| 44 | —$CH_3$ | None | H | H | 2-Cl | 3-$CH_3$ | H | Do. |
| 45 | —$C_2H_5$ | None | H | H | 2-$SO_2NH_2$ | H | H | Do. |
| 46 | —$C_2H_5$ | None | H | H | H | 3-$COC_6H_5$ | H | Blue-Violet. |
| 47 | —$C_2H_5$ | None | H | 9-$SO_2NH_2$ | H | H | H | Violet. |
| 48 | —(iso)$C_3H_6$ | —$CH_3$ | H | 9-$SO_2NH_2$ | H | H | H | Do. |
| 49 | —$C_2H_5$ | None | H | 9-$SO_2NH_2$ | 2-Cl | H | H | Do. |
| 50 | —$CH_3$ | —$CH_3$ | H | 9-$SO_2NH_2$ | 2-Cl | 3-$CH_3$ | H | Do. |
| 51 | —$C_2H_5$ | None | H | 9-$SO_2NH_2$ | 2-$CF_3$ | H | H | Bluish-Red. |
| 52 | —$C_2H_5$ | None | H | 9-$SO_2NH_2$ | 3-$SO_2CH_3$ | H | H | Red-Violet. |
| 53 | —$C_2H_5$ | None | H | 9-$CF_3$ | H | H | H | Violet. |
| 54 | —(iso)$C_3H_6$ | —$C_2H_5$ | H | 9-$CF_3$ | H | H | H | Do. |
| 55 | —$C_2H_5$ | None | H | 9-$OCH_3$ | H | H | H | Do. |
| 56 | —(iso)$C_3H_6$ | —$C_2H_5$ | H | 9-$OCH_3$ | H | H | H | Do. |
| 57 | —$C_2H_5$ | None | H | 9-$OCH_3$ | 2-Cl | H | H | Blue-Violet. |
| 58 | —$C_2H_5$ | —$CH_3$ | H | 9-$OCH_3$ | 2-Cl | H | H | Do. |
| 59 | —$CH_3$ | None | H | 9-$CH_3$ | 2-$CH_3$ | H | H | Do. |

| Example | R | (R¹)ₐ | R² | R³ | R⁴ | R⁵ | R⁶ | Color |
|---|---|---|---|---|---|---|---|---|
| 60 | —C₂H₅ | None | R₂ and R₃ combined at 9 and 10 pos. represent —CH=CH—CH=CH— | | H | H | H | Blue. |
| 61 | —C₂H₅ | —CH₃ | R₂ and R₃ combined at 9 and 10 pos. represent —CH=CH—CH=CH— | | H | H | H | Do. |
| 62 | —C₂H₅ | None | R₂ and R₃ combined at 8 and 9 pos. represent —CH=CH—CH=CH— | | H | H | H | Do. |
| 63 | —C₄H₉(n) | None | H | 9-NO₂ | H | H | H | Red-Violet. |
| 64 | —C₄H₉ | None | H | 9-NH₂ | H | H | H | Blue-Violet. |
| 65 | —CH₃ | None | H | 9-SO₂NH₂ | 2-Cl | 3-CH₃ | H | Violet. |
| 66 | —C₂H₅ | None | H | 9-CF₃ | 2-Cl | 3-Cl | 4-Cl | Red-Violet. |
| 67 | —C₂H₅ | None | H | 9-SO₂CH₃ | 2-Cl | 3-Cl | 4-Cl | Do. |
| 68 | —C₂H₅ | None | H | 9-SO₂CH₃ | 2-Cl | 3-CH₃ | H | Violet. |
| 69 | —C₂H₅ | None | H | 9-OCH₃ | 2-Cl | 3-CH₃ | H | Blue-Violet. |
| 70 | —CH₃ | None | H | 9-OCH₃ | 2-C₆H₅ | H | H | Reddish-Blue. |
| 71 | —C₂H₅ | None | H | 9-NHC₆H₅ | H | H | H | Do. |
| 72 | —C₂H₅ | —CH₃ | H | H | H | H | 4-NHC₆H₅ | Blue-Violet. |
| 73 | —CH₃ | None | 11-COCH₃ | H | H | H | H | Violet. |
| 74 | —C₃H₇(iso) | None | 10-CH₃ | H | H | H | H | Blue-Violet. |

The compounds and cations of the invention can be used for dyeing acrylic and modacrylic polymer fibers, yarns and fabrics giving fast red-violet to blue shades when applied thereto by conventional dye methods. Acrylic textile materials are those which consist of at least 85% acrylonitrile and modacrylic textile materials are those consisting of at least 35% but less than 85% acrylonitrile. The compounds and cations of the invention also give excellent dyeings on acid-modified acrylic textile materials such as the sulfonate modified acrylic fibers described in U.S. Patents 2,837,500, 2,837,501 and 3,043,811. The novel compounds and cations can also be used to dye the sulfonate modified polyester fibers described in U.S. Patent 3,018,272. Examples of the textile materials that are dyed with the compounds and cations of the invention are those sold under the tradenames "Orlon," "Orlon 42," "Verel," "Acrilan," Dyrel," "Creslan" and "Dacron 64." In general, the compounds and cations exhibit improved fastness, for example, to washing, to alkaline perspiration, gas (atmospheric fumes) and sublimation.

As described above, the 12-alkylquinoxalophenoxazine compounds and cations of the invention are characterized by a structure which is distinct from other compounds. This distinctive structure imparts unexpected properties to the present dyes, especially when they are used as dyes for dyeing acrylic and modacrylic textile materials, including affinity for acrylic fibers, and satisfactory brightness and fastness to light. Thus, we have found the compounds of the invention to possess excellent fastness properties when used as dyes on acrylic and modacrylic textile materials when such dyeings are tested by methods such as described in the A.A.T.C.C. Technical Manual, 1965 edition.

Textile materials dyed by the compounds and cations of the invention are characterized by containing at least about 35% combined acrylonitrile units and up to about 95% acrylonitrile units, and modified, for example, by 65-5% of vinyl pyridine units as described in U.S. Patents 2,990,393 (Re. 25,533) and 3,014,008 (Re. 25,539) or modified by 65-5% of vinylpyrrolidone units, for example, as described by U.S. Patent 2,970,783, or modified with 65-5% acrylic ester or acrylamide units as described in U.S. Patents 2,879,253, 2,879,254 and 2,838,470. Similar amounts of the other polymeric modifiers mentioned above are also useful. A preferred group of the copolymers readily dyeable with the dyes of the invention are the modacrylic polymers such as described in U.S. Patent 2,831,826 composed of a mixture of (A) 70-95% by weight of a copolymer of from 30 to 65% by weight of vinylidene chloride or vinyl chloride and 70-35% by weight of acrylonitrile, and (B) 30-5% by weight of a second polymer from the group consisting of (1) homopolymers of acrylamidic monomers of the formula

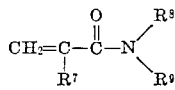

wherein R⁷ is selected from the group consisting of hydrogen and methyl, and R⁸ and R⁹ are selected from the group consisting of hydrogen and alkyl groups of 1–6 carbon atoms, (2) copolymers consisting of at least two of said acrylamidic monomers, and (3) copolymers consisting of at least 50% by weight of at least one of said acrylamidic monomers and not more than 50% by weight of a polymerizable monovinyl pyridine monomer.

Another type of modacrylic polymer that can be dyed with the compounds and cations of the invention is an acetone soluble mixture of (A) 70–95% by weight of a copolymer of 30–65% by weight of vinylidene chloride and 70–35% by weight of acrylonitrile and (B) 30–5% by weight of an acrylamide homopolymer having the above formula wherein R⁷, R⁸ and R⁹ are as described above. Specific polymers of that type contain 70–95% by weight of (A) a copolymer of from 30–65% by weight of vinylidene chloride and 70–35% by weight of acrylonitrile and (B) 30–5% by weight of a lower N-alkylacrylamide polymer such as poly-N-methacrylamide, poly-N-isopropylacrylamide and poly - N - tertiarybutylacrylamide.

The following example illustrates one way in which the compounds of the invention can be used to dye acrylonitrile polymer textile material.

Example 75

An amount of 0.1 gram of dye is dissolved by warming in 5 cc. of methyl Cellosolve. A 2% aqueous solution of a non-ionic surfactant, such as Igepal CA (a polymerized ethylene oxide-alkylphenol condensation product), is added slowly until a fine emulsion is obtained and then the dye mixture is brought to a volume of 200 cc. with warm water. Five cc. of a 5% aqueous solution of formic acid or acetic acid are added and then 10 grams of fabric made from an acrylic fiber is entered and, in the case of "Orlon 42" acrylic textile material, the dyeing is carried out at the boil for one hour. In the case of materials made of Verel acrylic fiber the dyebath temperature should not exceed 90° C. in order to avoid damage to the fiber. The dyed material is then washed well with water and dried.

The invention has been described in considerable detail with particular reference to certain preferred embodiments thereof, but it will be understood that variations and modifications can be effected within the spirit and scope of the invention.

We claim:
1. A composition of matter having the formula

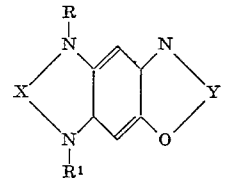

wherein
R represents lower alkyl;
R¹ represents lower alkyl or benzyl;
X represents o-phenylene, lower alkyl-o-phenylene, lower alkoxy-o-phenylene, halo-o-phenylene, cyano-o-phenylene, lower alkylsulfonyl-o-phenylene, carbamoyl-o-phenylene, lower alkylcarbamoyl-o-phenylene, hydroxy-o-phenylene, lower alkanoyl-o-phenylene, lower alkoxycarbonyl-o-phenylene, sulfamoyl-o-phenylene, lower alkylsulfamoyl-o-phenylene, lower alkylsulfonamido - o - phenylene, thiocyanato-o-phenylene, trifluoromethyl - o - phenylene, amino-o-phenylene, [phenyl-o - phenylene, benzoyl-o-phenylene,] phenylamino-o-phenylene, or, when Y represents an o-phenylene group, o-naphthylene;
Y represents o-naphthylene or an o-phenylene group having the formula

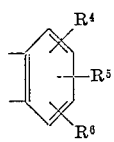

wherein
R⁴ represents hydrogen or halogen;
R⁵ represents hydrogen, lower alkyl, lower alkoxy, halogen, lower alkanoylamino, nitro, cyano, lower alkylsulfonyl, carbamoyl, lower alkylcarbamoyl, hydroxy, lower alkanoyl, lower alkoxycarbonyl, sulfamoyl, lower alkylsulfonyl, lower alkylsulfonamido, thiocyanato, trifluoromethyl, amino, phenyl, benzoyl, or phenylamino; and
R⁶ represents hydrogen or halogen; and
Z represents a monovalent acid anion selected from the group consisting of lower alkylsulfate, halogen, p-toluenesulfonate, and benzenesulfonate.

2. A composition of matter as defined in claim 1 wherein
R¹ represents lower alkyl;
X represents an o-phenylene group of the formula

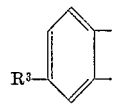

wherein R³ represents hydrogen, sulfamoyl, lower alkylsulfonyl, trifluoromethyl, lower alkyl, halogen or lower alkoxy; and Y represents o-naphthylene or an o-phenylene group of the formula

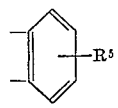

wherein R⁵ represents hydrogen, lower alkyl, trifluoromethyl, halogen, nitro, sulfamoyl, or lower alkylsulfonyl.

3. A composition of matter as defined in claim 1 wherein
R¹ represents lower alkyl; X represents o-phenylene; and Y represents o-phenylene or naphthylene.

4. A composition of matter as defined in claim 1 having the formula

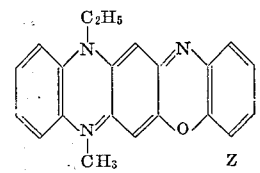

5. A composition of matter as defined in claim 1 having the formula

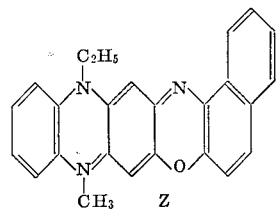

6. A composition of matter as defined in claim 1 having the formula

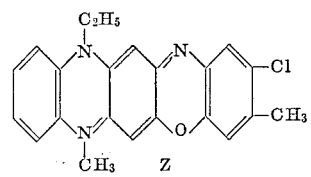

7. A composition of matter as defined in claim 1 having the formula

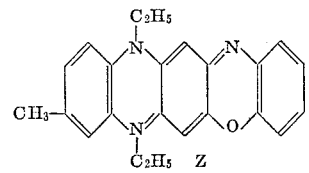

References Cited

Beilsteins Handbuch Der Organischen Chemie 4th Ed. vol. 27, pp. 778–9 Berlin, Springer, 1937.

Diepolder Berichte vol. 32, pp. 3520–8 Relied on (1899).

Kehrmann et al. I Chem. Abst. vol. 21, pp. 743–4 (1927).

Kehrmann et al. II Helv. Chim. Act. vol. 8, pp. 16–20 (1925).

Yuasa Chem. Abst. vol. 48, Column 12900 (1954).

H R. JILES, Primary Examiner

N. TROUSOF, Assistant Examiner

U.S. Cl. X.R.

8—55; 260—37, 41, 41.5, 267, 556, 570, 575, 577

PO-1050
(5/69)

UNITED STATES PATENT OFFICE
CERTIFICATE OF CORRECTION

Patent No. _____3,485,832_____ Dated _____December 23, 1969_____

Inventor(s) _____Raymond C. Harris and James M. Straley_____

It is certified that error appears in the above-identified patent and that said Letters Patent are hereby corrected as shown below:

Claim 1, Column 10, lines 68 through 74, the formula should read:

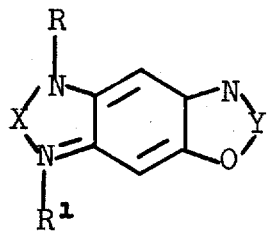

Claim 1, Column 11, line 13, cancel "[phenyl-o-phenylene, benzoyl-o-phenyl-", and line 14, cancel "ene,]".

SIGNED AND
SEALED
JAN 12 1971

(SEAL)
Attest:

Edward M. Fletcher, Jr.
Attesting Officer

WILLIAM E. SCHUYLER, JR.
Commissioner of Patents